United States Patent
Takahashi et al.

(10) Patent No.: US 6,721,829 B1
(45) Date of Patent: Apr. 13, 2004

(54) INFORMATION TRANSMISSION METHOD, INFORMATION PROCESSING METHOD, INFORMATION PROCESSING APPARATUS, ELECTRONIC DEVICE, AND IMAGING APPARATUS

(75) Inventors: Yukio Takahashi, Tokyo (JP); Hirotomo Fukuda, Kanagawa (JP); Kazunori Okino, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/502,437

(22) Filed: Feb. 11, 2000

(30) Foreign Application Priority Data

Feb. 16, 1999 (JP) .......................................... P11-037928
Feb. 23, 1999 (JP) .......................................... P11-045112

(51) Int. Cl.$^7$ .............................................. G06F 13/00

(52) U.S. Cl. ............................. 710/69; 710/5; 710/33; 710/65

(58) Field of Search ................. 710/5, 33, 65, 710/69

(56) References Cited

U.S. PATENT DOCUMENTS 3,979,561 A * 9/1976 Hinkle et al. ................ 370/533
4,412,182 A * 10/1983 Yochum ....................... 330/59
5,166,956 A * 11/1992 Baltus et al. ................ 375/286
6,310,588 B1 * 10/2001 Kawahara et al. ............ 345/63
6,317,518 B1 * 11/2001 Enari .......................... 382/232

* cited by examiner

Primary Examiner—Jeffrey Gaffin
Assistant Examiner—Mohammad O. Farooq
(74) Attorney, Agent, or Firm—Jay H. Maioli

(57) ABSTRACT

In order to connect a control signal processing system of a device, which does not have a control signal processing system for coding and processing a control signal, to a control signal processing system for coding and processing such a control signal, circuitry is added to the existing control signal processing systems for delivering mutual signals between a control signal processing system (1) for coding and processing control signals such as VISCA and a control signal processing system for processing a signal representing information as a signal level value. It thus becomes possible to connect control signals of a device (30, 37, 38) which does not have a control signal processing system for coding and processing the control signal to a control signal processing system (1) for coding and processing the control signal.

5 Claims, 9 Drawing Sheets

FIG. 2A

```
Input Port 1 → Command Section
Input Port 2 → Parameter Section
              (High-Order Digits)
Input Port 3 → Parameter Section
              (Low-Order Digits)
              ⋮
Input Port n → Undefined Output Port 1 → Message Section
Output Port 2 → Parameter Section
               (High-Order Digits)
Output Port 3 → Parameter Section
               (Low-Order Digits)
               ⋮
Output Port n → Undefined
```

FIG. 2B

| Camera No. | Command Section | Parameter Section | Terminator |
|---|---|---|---|
| 8X | 01 04 47 | 0Z 0Z 0Z 0Z | FF |

FIG. 2C

| Message Section | Parameter Section | Terminator |
|---|---|---|
| Y0 50 | 0Z 0Z 0Z 0Z | FF |

(Packet Reply)

FIG. 2D

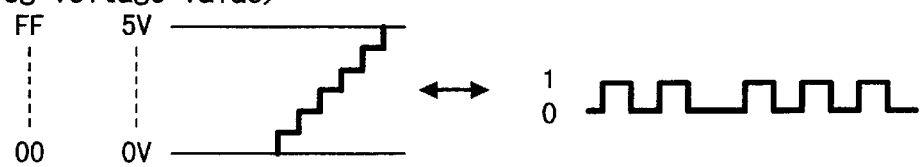

(Analog Voltage Value)

FIG. 4A  Instruction Encoding Table (1): For Command  20

| Input Port I-1 Voltage Value [mV] | 5. Output Value | VISCA Packet Command Section | Command Name | Reply |
|---|---|---|---|---|
| 0 | 00 | — | No Command | |
| 20 | 01 | 81 01 04 00 02 | CAM Power On | |
| 40 | 02 | 81 01 04 47 | CAM Zoom Direct | |
| | | | | |
| 2000 | 64 | | Encoding Table Number Enquiry | See Camera State Decoding Table |
| | | | | |
| 4940 | FC | 81 01 04 07 00 | CAM Zoom Stop | |
| 4960 | FD | 81 21 | Command Execution Suspension (Socket Number 1) | |
| 4980 | FE | 81 22 | Command Execution Suspension (Socket Number 2) | |
| 5000 | FF | | Encoding Table Number Indication | |

FIG. 4B  Instruction Encoding Table (2): For Enquiry (Indication of State, Etc.,)  21

| Input Port I-1 Voltage Value [mV] | 5. Output Value | VISCA Packet Command Section | Command Name | Reply |
|---|---|---|---|---|
| 0 | 00 | — | No Command | |
| 20 | 01 | 81 01 04 00 02 | CAM PowerInq On | |
| 40 | 02 | 81 01 04 47 | CAM Zoom PosInq | |
| | | | | |
| 2000 | 64 | | Encoding Table Number Enquiry | See Camera State Decoding Table |
| | | | | |
| 4960 | FD | 81 21 | Command Execution Suspension (Socket Number 1) | |
| 4980 | FE | 81 22 | Command Execution Suspension (Socket Number 2) | |
| 5000 | FF | | Encoding Table Number Indication | |

FIG. 5

Camera State Decoding table

| Input Port 1-1 Voltage Value [mV] | 5.Output Value | VISCA Packet Reply | Reply Contents |
|---|---|---|---|
| 0 | 00 | — | No Command State |
| 20 | 01 | 10 50 02 | CAM Powering on state(Socket Number 1) |
| 40 | 02 | 20 50 02 | CAM Powering on state(Socket Number 2) |
| 60 | 03 | 10 50 | CAM Zoom Posing state(Socket Number 1) |
| 80 | 04 | 20 50 | CAM Zoom Posing state(Socket Number 2) |
| ... | ... | ... | ... |
| 2000 | 64 | X0 41 | ACK(Socket Number 1) |
| 2020 | 65 | X0 42 | ACK(Socket Number 2) |
| ... | ... | ... | ... |
| 4000 | C8 | X0 61 01 | Message Lenght Error(Socket Number 1) |
| ... | ... | ... | ... |
| 4080 | CC | X0 61 04 | Command Cancel(Socket Number 1) |
| ... | ... | ... | ... |
| 4600 | E6 | X0 51 | Completion(Socket Number 1) |
| 4620 | E7 | X0 52 | Completion(Socket Number 2) |
| 5000 | FF | X0 ?? ?? ?? | Encoding Table Number Indication |

INFORMATION TRANSMISSION METHOD, INFORMATION PROCESSING METHOD, INFORMATION PROCESSING APPARATUS, ELECTRONIC DEVICE, AND IMAGING APPARATUS

BACKGROUND OF THE INVENTION

1. Technical Field

The present invention relates to an information transmission method, information processing method, information processing apparatus, electronic device, and imaging apparatus.

2. Description of the Related Art

There has been put into practical use such a video camera system that a control port conforming to the RS-232C standards is provided in each of a video camera apparatus and a camera controller apparatus and coded control data can be transmitted between the apparatuses.

In the ensuing description, a protocol of RS-232C standards used to transmit control signals between the video camera apparatus and an external device such as camera controller apparatus is referred to as VISCA (Video System Control Architecture).

When utilizing information transmission based upon the VISCA, each of the video camera apparatus and the external device needs to have means for converting an ordinary camera control signal representing information with a signal level value to coded data conforming to the VISCA and means for converting the coded data to such an ordinary camera control signal. Even if a camera apparatus equipped with a control port conforming to the VISCA is prepared, it is unadvantageously impossible to connect the camera apparatus to the camera controller apparatus and use them unless the camera controller apparatus includes a control port conforming to the VISCA.

In other words, when transmitting information such as control data conforming to the VISCA between the video camera apparatus and the camera control apparatus, it is indispensable to equip both of these apparatuses with means for converting ordinary control data to coded data conforming to the VISCA and means for converting this coded data to an ordinary control signal.

In the case where a camera has been updated to a camera having a control port conforming to the VISCA, therefore, it becomes necessary to update an external device to be connected to the control port of this video camera apparatus for use such as the camera controller apparatus and the like to an external device having a control port conformed to the VISCA. Unadvantageously, therefore, an expense for updating the external device must be prepared.

SUMMARY OF THE INVENTION

The present invention has been implemented in view of these points. An object of the present invention is to provide an apparatus having a control port conforming to the VISCA with data conversion means for performing conversion between input/output coded data conforming to the VISCA and control data having information as a signal level value, make it possible to connect a device which does not have a control port conforming to the VISCA to the above described apparatus having the control port conforming to the VISCA, eliminate the restrictions irrespective of whether the control port is present or not, and expand the degree of freedom on connection between devices.

BRIEF DESCRIPTION OF THE DRAWINGS

FIGS. 2A, 2B, 2C, and 2D are diagrams showing a command table of the control signal processing unit according to the present invention;

FIGS. 4A and 4B are diagrams showing still another encoding table of the control signal processing unit according to the present invention;

FIG. 5 is a diagram showing a decoding table of the control signal processing unit according to the present invention;

DESCRIPTION OF THE PREFERRED EMBODIMENT

Hereafter, an embodiment of the present invention will be described by referring to the attached drawings.

Figure 1:
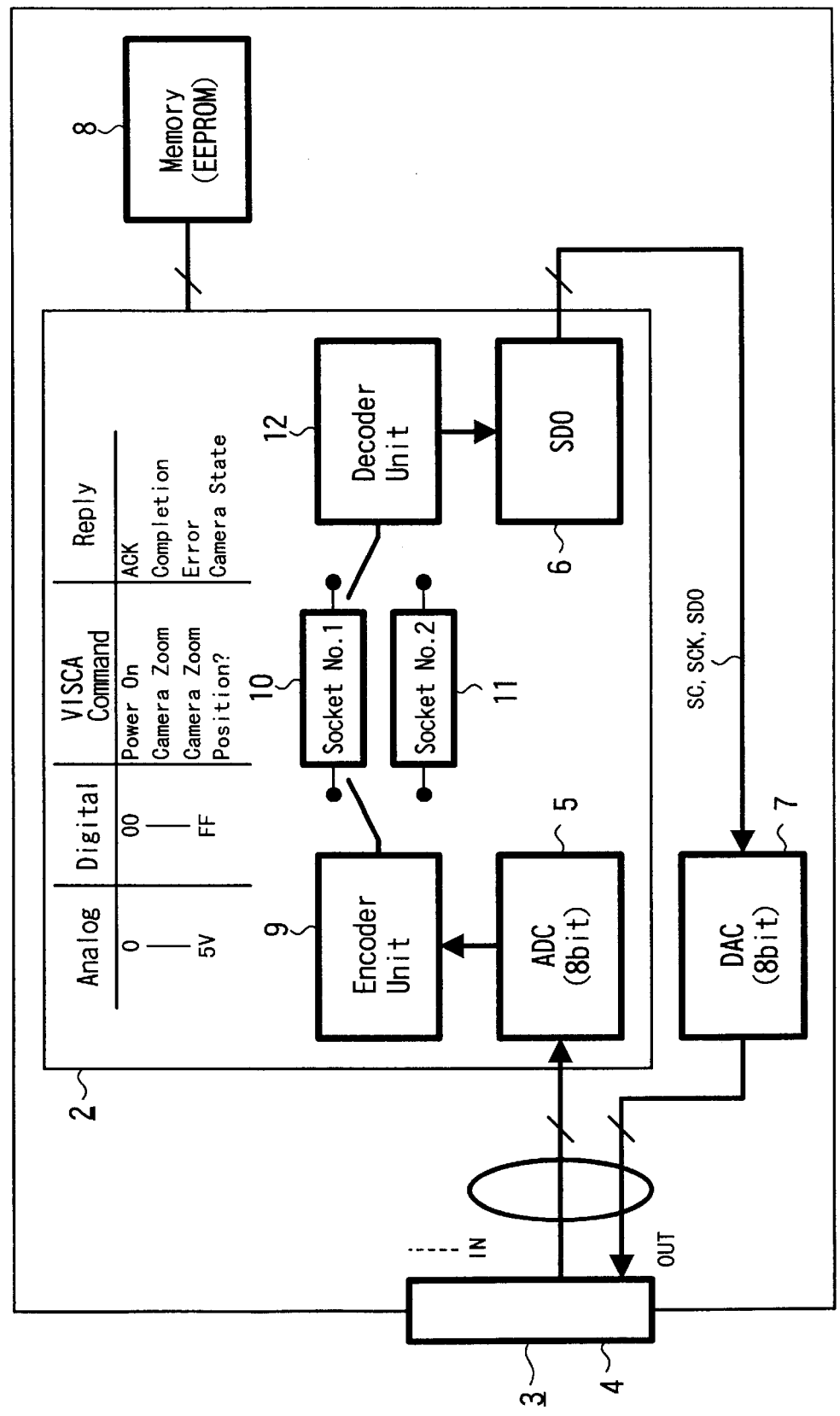
FIG. 1 is a block diagram showing the configuration of a control signal processing unit according to the present invention.

FIG. 1 is a circuit block diagram showing a principal part of a configuration of an information processing unit for processing control data of the VISCA standards according to the present invention. Numeral 1 denotes a control signal processing unit of a video camera apparatus. The control signal processing unit 1 includes a one-chip microcomputer unit 2, a connector unit 3, a 8-bit D-A converter unit 7, and a data storage memory unit 8 which has EEPROM. The one-chip microcomputer unit 2 includes an 8-bit A-D converter unit 5, a serial data output unit 6, an encoder unit 9, a socket 10, a socket 11, and a decoder unit 12.

Furthermore, this control signal processing unit 1 has a function of controlling the operation of this video camera apparatus itself on the basis of a VISCA Packet command sent to the sockets.

The connector unit 3 includes a connector for connecting the control signal processing unit 1 of the video camera apparatus to the camera controller apparatus. The data storage memory unit 8 is a data storage memory for storing commands and so on of the one-chip microcomputer unit 2. The encoder unit 9 is an encoder unit for encoding 8-bit digital data to a VISCA command of a VISCA Packet data form. The sockets 10 and 11 are buffer memories to be used when executing this VISCA command.

En By providing two sockets, i.e., the sockets 10 and 11, up to two VISCA commands can be received at a time.

As shown in FIG. 2A, the connector unit 3 includes an input port I-1, . . . , an input port I-n, and an output port O-1, . . . , output port O-n. Among these input/output ports, the input port I-1, input port I-2, input port I-3, output port O-1, output port O-2, and output port O-3 form a user port 4.

In the present embodiment, a command section of this VISCA Packet is assigned to the input port I-1 as shown in FIG. 2A. A high-order digit portion of a parameter section of the VISCA Packet is assigned to the input port I-2. A low-order digit portion of the parameter section of the VISCA Packet is assigned to the input port I-3. A message section of a Packet Reply is assigned to the output port O-1. A high-order digit portion of a parameter section of the Packet Reply is assigned to the output port O-2. A low-order digit portion of the parameter section of the Packet Reply is assigned to the output port O-3.

An input side of the 8-bit A-D converter unit 5 is connected to the input ports I-1, I-2 and I-3 of the user port 4. An output side of the 8-bit A-D converter unit 5 is connected to an input side of the encoder unit 9. An output side of the encoder unit 9 is selectively connected to an input side of either the socket 10 or the socket 11 via a first selection switch.

Furthermore, output sides respectively of the sockets 10 and 11 are selectively connected to an input side of the decoder unit 12 via a second selection switch. An output side of the decoder unit 12 is connected to an input side of the serial data output unit 6. An output side of the serial data output unit 6 is connected to an input side of the D-A converter unit 7. An output side of the 8-bit D-A converter unit 7 is connected to the output ports O-1, O-2 and O-3 of the user port 4.

As indicated by "Analog" in a block illustrated as the one-chip microcomputer unit 2 of FIG. 1, the value of the control signal inputted from the camera controller apparatus to the input ports I-1, I-2 and I-3 changes in level between 0 volt (0 mV) and 5 volts (5000 mV) with predetermined steps shown in FIG. 2D. The control signal is a signal which conveys control information by this level change. The spacing between 0 volt (0 mV) and 5 volt s (5000 mV) is divided into voltage levels of 256 steps.

The signal inputted to the input ports I-1, I-2, and I-3 and indicated as "Analog" is A-D converted by the 8-bit A-D converter unit 5 to hexadecimal data of 256 kinds in the range of 00 to FF as indicated as "Digital" in the block.

Furthermore, each of data in the range of 00 to FF is converted to an associated command data included in VISCA command data indicated by "VISCA Command" in this block, by the encoder unit 9. Each of the VISCA command data thus obtained by the conversion is stored by alternately selecting the sockets 10 and 11 with the first selection switch. In this control signal processing unit 1, the operation of the video camera apparatus is controlled according to the stored VISCA command data. By the way, internal data of this "VISCA Command" has a data configuration as shown in FIG. 2B.

And reply data representing a result of operation control of this video camera apparatus is obtained as some of data of data (ACK, . . . ) indicated by "Reply" in this block. This reply data is stored on either the socket 10 or the socket 11 which is not selected by the first selection switch. The socket of the stored side is selected by the second selection switch, and the reply data is read out and supplied to the decoder unit 12.

In the decoder 12, digital data associated with the reply data is selected out of digital data indicated by "Digital" in this block. The selected digital data is subjected to D-A conversion in the 8-bit D-A converter unit 7. A signal level indicated by "Analog" in the block and associated with the digital data thus obtained is outputted from the output port O-1. The "Reply" data is formed by internal data as shown in FIG. 2C.

In the control signal processing unit 1 of the video camera apparatus described with reference to FIG. 1, therefore, it is possible to generate VISCA packet command data according to a control signal indicated by "Analog" inputted from the camera controller apparatus to the input ports I-1, I-2, and I-3, control the operation of the video camera apparatus on the basis of the generated data, convert reply data indicating a result of the control to a control signal indicated by "Analog", and send out the control signal from the output port O-1, O-2, and O-3 to the camera controller apparatus.

Even if the camera controller apparatus does not have a control unit capable of effecting control according to the VISCA, therefore, the control signal processing unit 1 of the video camera apparatus described with reference to FIG. 1 makes it possible to control the video camera apparatus from the camera controller apparatus by connecting the control signal processing unit 1 to a control unit of the camera controller apparatus.

As for the data of the command section of the VISCA Packet and the message section of the Packet Reply, the data are taken into the socket 10 and the socket 11 after being subjected to A-D conversion in the A-D converter 5 and encoded in the encoder unit 9. As for the data of the parameter portions of VISCA Packet and the Packet Reply, the data subjected to A-D conversion in the A-D converter 5 are taken into the socket 10 and the socket 11 as they are and utilized as data.

Figure 3:
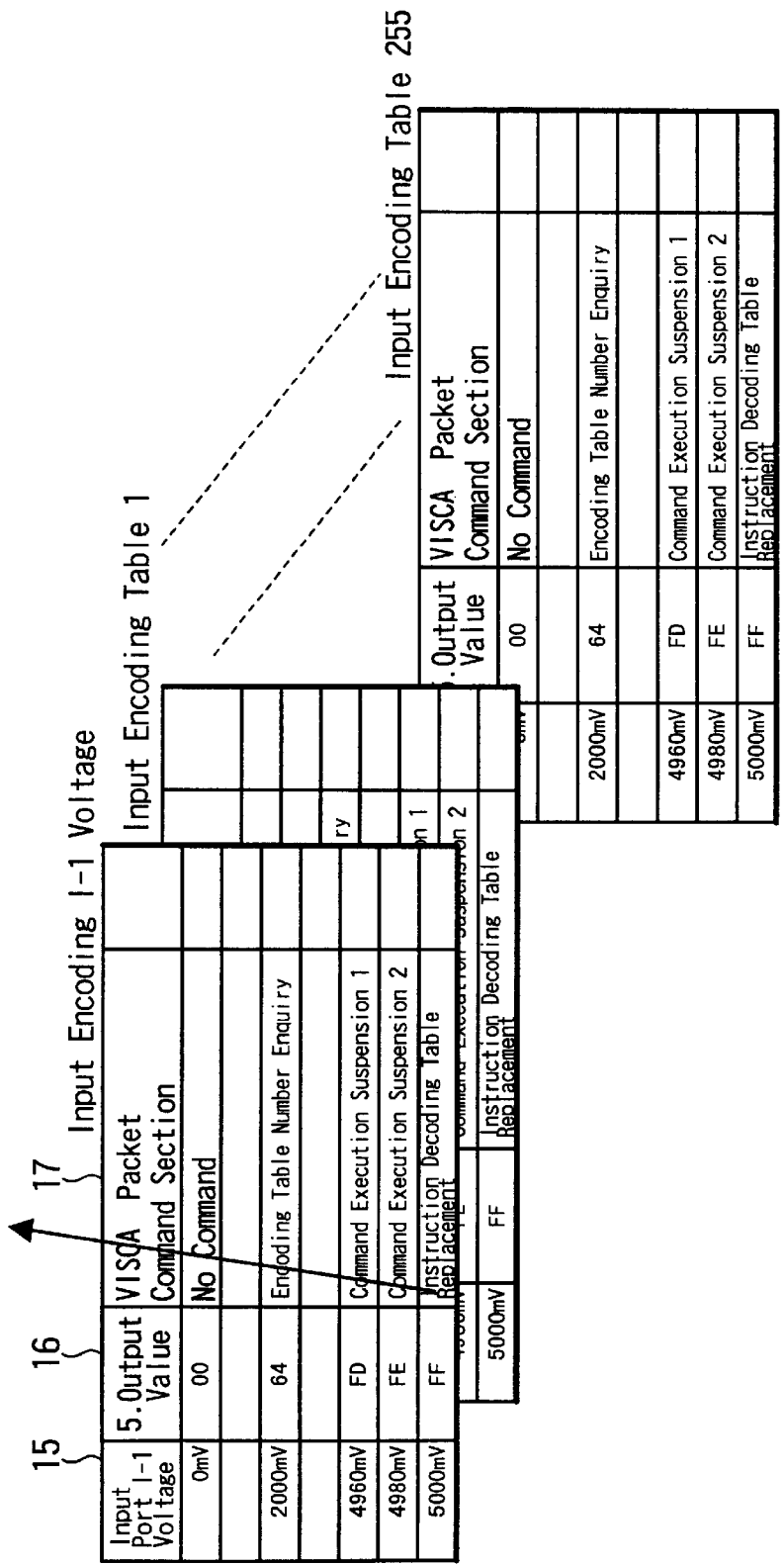
FIG. 3 is a diagram showing another encoding table of the control signal processing unit according to the present invention.

With reference to an input encoding table 0 to 255 shown in FIG. 3, a camera state decoding table shown in FIG. 5, and FIGS. 4A and 4B, data generated in the control signal processing unit 1 of the video camera apparatus will now be described in more detail. In FIG. 4A, 20 shows details of contents of an encoding table T-1 as shown in FIG. 3. In FIG. 4B, 21 shows details of contents of an encoding table T-2.

In a column 15 of FIG. 3, the voltage inputted in the input port I-1 is indicated as "Input Port I-1 Voltage". In a column 16, digital data outputted from the 8-bit A-D converter unit 5 in association with each of voltages inputted to the input port I-1 is indicated as "5. Output Value". In a column 17, encoding instructions concerning various VISCA commands and various inquiries outputted from the encoder unit 9 in association with respective digital data outputted from the converter unit 5 are indicated as "VISCA Packet Command Section".

As shown in FIG. 5, a voltage value outputted from the output port O-1 is indicated as a column "Output Port O-1 Voltage Value [mV]". Output data of the serial data output unit 6 obtained in association with these voltage values are indicated as a column "6. Output Value". Reply data obtained from the encoder unit 9 in association with respective output data are indicated as a column "VISCA Packet Reply". Reply contents of these Reply data are indicated as a column "Reply Contents".

When the input voltage of the input port I-1 indicated in the column "Input Port I-1 Voltage" is 0 mV such a state as to output the output voltage of 0 mV from the output O-1 or such a state as to make the impedance of the output O-1 high is maintained.

Furthermore, when the input voltage of the input port I-1 indicated in the column "Input Port I-1 Voltage" is 4960 mV or 4980 mV, "Command Cancel" is sent out from the output port O-1.

In the configuration shown in FIG. 1, level changes of up to 256 stages can be discriminated as the input voltage of the input port I-1. It is possible to input commands or inquiries of 256 kinds to the input port I-1 and discriminate them.

As a matter of fact, however, tables of a plurality of combinations are prepared as shown in FIGS. 3 and 4 in order to cope with a shortage in the number of commands due to use of commands and the like (such as no command) or in order to make it possible to alter a combination of commands for each of these tables.

In the present embodiment, there are prepared instructions such as an "Encoding Table Replacement" (conversion) instruction and "Encoding Table Number Inquiry" as shown in FIGS. 3, 4A and 4B, and "Encoding Table Number Indication" as shown in FIG. 5 and the like, in order to make it possible to prepare a table of a plurality of command combinations.

Ad Besides the "Encoding Table Replacement" instruction, "Encoding Table Number Inquiry", and "Encoding Table Number Display", "No Commands", "Command Execution Suspension" (Socket Number 1) and "Command Execution Suspension" (Socket Number 2) are prepared in common to all tables of the encoding tables shown in FIGS. 3 and 4. The socket number 1 indicates the socket 10 shown in FIG. 1. The socket number 2 indicates the socket 11 shown in FIG. 1.

In the camera state decoding table (output system) shown in FIG. 5 as well, there exist messages such as "Encoding Table Number Indication". In the present embodiment, however, there exists only one table like this table.

As an example, in the case where it is necessary to replace a certain encoding table with the encoding table T-2, the certain encoding table can be replaced with (converted to) the encoding table 2 by giving the "Encoding Table Replacement Instruction" (5000 mV) to the input port I-1 and giving "Table Number T-2" (20 mV) to the input port I-2. Furthermore, when ascertaining the existence of the encoding table number T-2, the "Encoding Table Number Inquiry" (2000 mV) is given to the input port I-1. By doing so, the "Encoding Table Number Indication" (5000 mV) is outputted to the output port I-1 as a voltage value and the "Table Number T-2" (20 mV) is given to the input port I-2 as a voltage value. The encoding table number T-2 can be thus ascertained.

Figure 6:
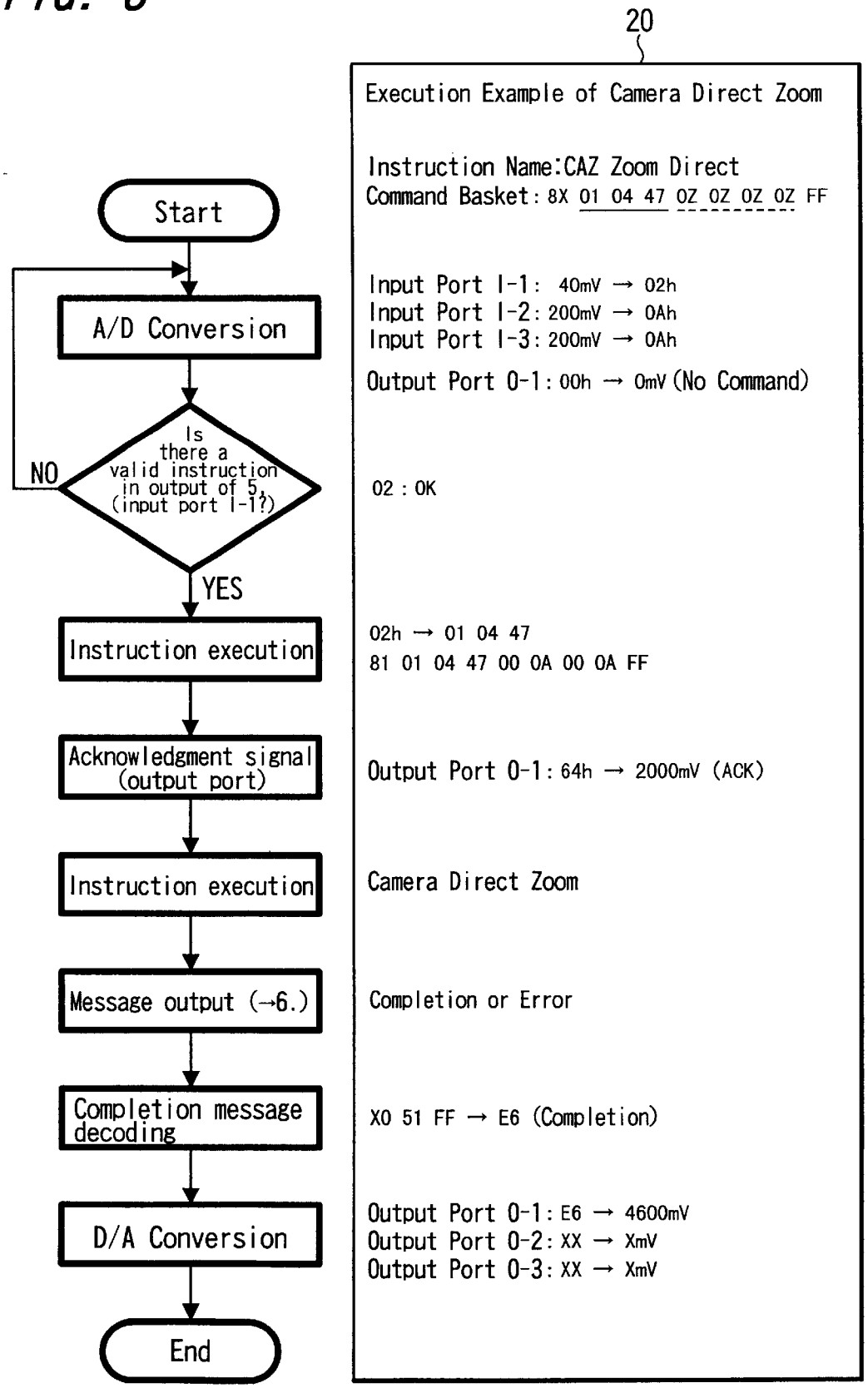
FIG. 6 is a flow chart for description of operation of the control signal processing unit according to the present invention.

It is now assumed that control data having control information as a signal level value is inputted from a camera controller apparatus which does not have a data processing function conforming to the VISCA standards to the user port 4, and thereby camera direct zooming is executed in the control signal processing unit 1 of the video camera apparatus. Operation of the control signal processing unit 1 conducted in this case will now be described by referring to a flow chart shown in FIG. 6. A data table 20 in FIG. 6 shows data obtained by executing a routine in each of the steps of the flow chart and executed operations.

In such a state that data is not inputted from the camera controller apparatus to the user port 4, 0 mV is inputted to the input port I-1 and 0 mV is outputted to the output port O-1. In this state, the camera controller apparatus inputs a voltage value of 40 mV to the input port I-1 of the user port 4, a voltage value of 200 mV to the input port I-2, and a voltage value of 200 mV to the input port I-3 as a signal for ordering execution of the camera direct zooming.

Upon these inputs, the operation of the control signal processing unit 1 proceeds to "A-D Conversion" step. In the 8-bit A-D converter unit 5, these voltage values are converted as 40 mV→02h, 200 mV→0Ah, and 200 mV→0Ah.

Upon completion of this operation, the control signal processing unit 1 proceeds to "Is there a valid instruction in output of 5", and determines whether the data thus converted to hexadecimal data is effective as a CAM Zoom Direct instruction. If it is judged to be valid (Yes), the operation proceeds to "Instruction Encoding" step. In the encoder unit 9, this digital data 02h is converted to data of the command section of the VISCA packet (having a command name "CAM Zoom Direct"). Thereafter, the operation proceeds to "Acknowledgment Signal (Output Port)" step. In response to a Reply command ACK, a signal having a level value of 2000 mV is sent out from the output port O-1.

Furthermore, the operation proceeds to "Instruction Execution" step. In the control signal processing unit 1 of the video camera apparatus, camera direct zooming is executed according to the data of the command section of the VISCA Packet (having a command name "CAM Zoom Direct").

Furthermore, the operation proceeds to "Message Output (→6.)" step. It is determined whether the data of the command section of the VISCA Packet obtained from the output of the serial data output section 6 (having a command name "CAM Zoom Direct") has been executed correctly. If VISCA Packet Reply Completion data "XO 51 FF" is outputted from the serial data output unit 6 as Reply contents, the execution is judged to be correct. The operation proceeds to "Completion Message Decoding" step.

At the "Completion Message Decoding" step, the VISCA Packet Reply Completion data "XO 51 FF" is converted to digital data E6. The operation proceeds to "D/A Conversion" step. The digital data E6 is converted to a signal having a level value of 4600 mV shown in FIG. 5. The signal having a level value of 4600 mV is outputted from the output port O-1. The operation of the flow chart shown in FIG. 6 is thus completed.

If an error is judged to have occurred in "Message Output (→6.)" step, a signal having a voltage level value depending on an error message is sent out to the output port O-1.

In other words, according to the present embodiment, in the case where a control signal supplied from the external camera controller apparatus to the user port 4 is a control signal having control information as a signal level value, the control signal having control information as a signal level value can be processed in accordance with the processing procedure of the control signal according to the VISCA in the control signal processing unit 1 of the video camera apparatus, by executing the procedure shown in the flow chart of FIG. 6.

As a result, it is possible to cause a video camera apparatus having the control signal processing unit 1 of such a type as to execute the processing of the control signal according to the VISCA to execute the camera direct zooming by means of control information represented by a voltage level value supplied from the camera controller apparatus.

Furthermore, in the present embodiment, the operation for causing a video camera apparatus having the control signal processing unit 1 of such a type as to execute the processing of the control signal according to the VISCA to execute the camera direct zooming has been described as an example. According to the present embodiment, however, the operation is not restricted to the operation for causing the camera direct zooming to be executed, but it may be applied to various other controls for the video camera apparatus.

Another embodiment of the present invention will now be described by referring to FIG. 7. The same components as those shown in FIGS. 1 to 6 are denoted by like characters, and detailed description thereof will be omitted.

Figure 7:
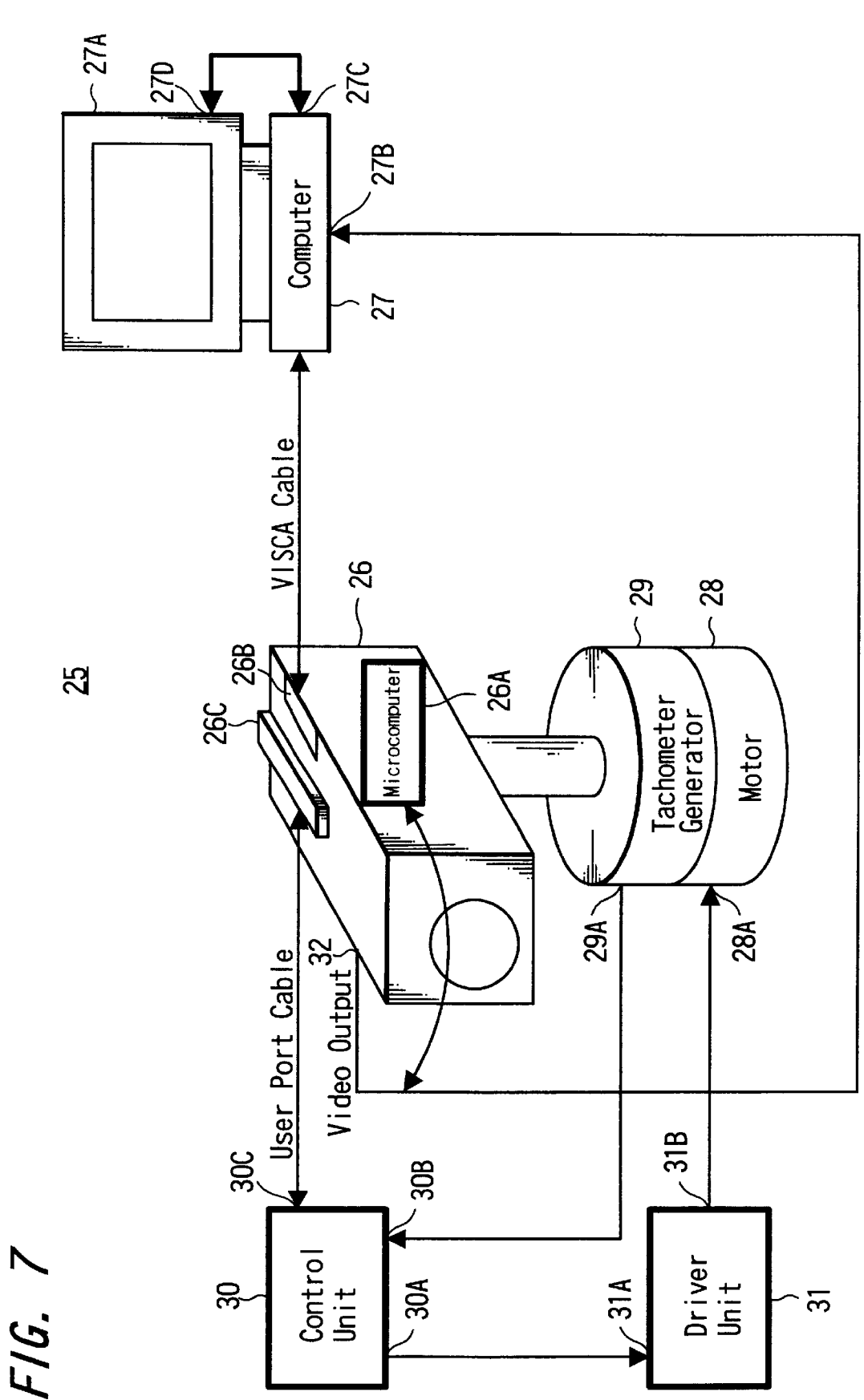
FIG. 7 is a block diagram for description of another embodiment of the present invention.

In FIG. 7, 25 denotes a whole pan/tilt system of a video camera main body 26. The pan/tilt system 25 includes the video camera main body 26. The pan/tilt system 25 further includes a one-chip microcomputer 26A, an input/output port 26B and a user port 26C conforming to the VISCA standards, which are incorporated into the video camera main body 26. The pan/tilt system 25 further includes a computer main body 27, a computer monitor 27A, a drive motor 28, a tachometer generator 29, a control unit 30, a driver unit 31, and a video signal output terminal 32.

An input/output port of the computer main body 27 conforming to the VISCA standards is connected to the input/output port 26B of the video camera main body 26 conforming to the VISCA standards via a VISCA cable. The user port 26C of the video camera main body 26 is connected to a user input/output port 30C of the control unit 30. A control signal output 30A of the control unit 30 is connected to a control signal input 31A of the driver unit 31. A drive signal output 31B of the driver unit 31 is connected to a drive signal input 28A of the drive motor 28.

A camera pan/tilt angle information signal output side 29A of the tachometer generator 29 is connected to an angle information signal input side 30B of the control unit 30. The video signal output terminal 32 of the video camera main body 26 is connected to a video signal input side 27B of the computer main body 27. A tablet signal port 27C of the computer main body 27 is connected to a tablet signal port 27D of the computer monitor 27A. The pan/tilt operation system is formed so that the state of driving of the drive motor 28 conducted by the driver 31 may be controlled from the computer main body 27 to perform the camera pan/tilt operation.

Furthermore, in commands conforming to the VISCA standards, commands for controlling the pan/tilt operation are prepared. In the present embodiment, it is made possible to send the commands conforming to the VISCA standards from the computer main body 27 to the one-chip microcomputer 26A of the video camera main body 26 via the VISCA cable and the input/output port 26B conforming to the VISCA standards.

The one-chip microcomputer 26A is a computer which has a configuration similar to that of the one-chip microcomputer unit 2 described with reference to FIGS. 1 to 6 and which can perform an operation similar to that of the one-chip microcomputer unit 2. The user port 26C is a port capable of inputting/outputting signals in the same way as the user port 4 described with reference to FIGS. 1 to 6.

Even if the control unit 30 is in such a state that it cannot transmit and receive control information by using commands conforming to the VISCA standards, therefore, information can be transmitted and received by using commands conforming to the VISCA standards between the main body 27 and the one-chip microcomputer 26A in the present embodiment. In addition, information transmission and reception according to the control information can be performed-between the one-chip microcomputer 26A and the control unit 30 via the user port 26C.

In the present embodiment, therefore, it becomes possible to control the control unit 30 from the computer main body 27 by using information on commands conforming to the VISCA standards even if the control unit 30 is in such a state that it cannot transmit and receive control information by using commands conforming to the VISCA standards. It is thus possible to control the pan/tilt operation by using the commands conforming to the VISCA standards.

Furthermore, in the present embodiment, it becomes possible to control the control unit 30 which is in such a state that it cannot transmit and receive information by using commands conforming to the VISCA standards, by specifying a specific position on a monitor screen of the computer monitor 27A such as a color position by using the tablet, conveying this position information from the tablet signal port 27D of the computer monitor 27A to the tablet signal port 27C of the computer main body 27, sending a command conforming to the VISCA standards for controlling the pan/tilt operation so as to direct imaging direction of the video camera main body 26 toward the specified position on the monitor screen, from the computer main body 27 to the input/output port 26B, and controlling the control unit 30 from the one-chip microcomputer 26A via the user port 26C.

Still another embodiment of the present invention will now be described by referring to FIG. 8. The same components as those shown in FIGS. 1 to 7 are denoted by like characters, and detailed description thereof will be omitted.

Figure 8:
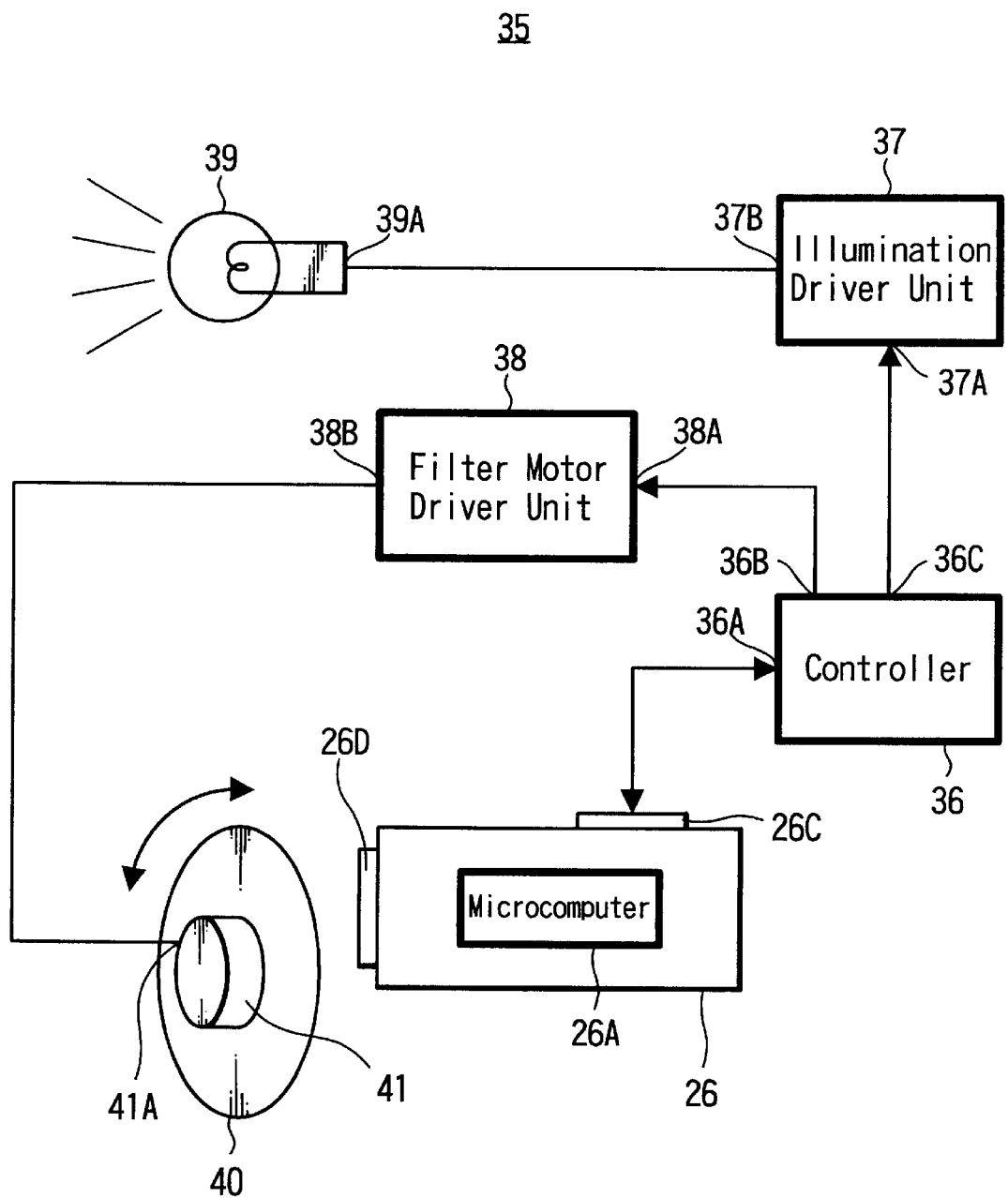
FIG. 8 is a block diagram for description of still another embodiment of the present invention.

In the embodiment shown in FIG. 8, numeral 35 denotes a whole imaging system. The imaging system 35 includes a video camera main body 26. The imaging system 35 further includes a one-chip microcomputer 26A, a user port 26C, and a lens block unit 26D, which are incorporated into the video camera main body 26. The imaging system 35 further includes a controller 36, a illumination driver unit 37, a filter motor driver unit 38, an illumination apparatus 39, a variable ND filter 40, and a drive motor 41 for rotating the variable ND filter 40.

The user port 26C is connected to a control signal input/output port 36A of the controller 36. A driver control signal output end 36B of the controller 36 is connected to a control signal input end 38A of the filter motor driver unit 38. A drive signal output end 38B of the driver unit 38 is connected to a drive signal input end 41A of the drive motor 41. A control signal output terminal 36C of the controller 36 is connected to a control signal input end 37A of the illumination driver unit 37. An illumination power output end 37B of the illumination driver unit 37 is connected to an illumination power input end 39A of the illumination apparatus 39.

In the configuration shown in FIG. 8, a subject illuminated by the illumination device 39 is shot by the lens block unit 26D through the variable ND filter 40. In the video camera main body 26, a signal level value of the shot subject is detected. The signal level value is supplied to a built-in one-chip microcomputer 26A. In the one-chip microcomputer 26A, an illuminance level control signal for supplying the subject with a proper illuminance is generated on the basis of the signal level value. The illuminance level control signal is sent from the computer 26A to the control signal input/output port 36A of the controller 36 via the user port 26C.

In the controller 36, an illumination control signal having a predetermined level value and a driver control signal are generated on the basis of the illuminance level control signal sent from the controller 36. The illumination control signal is supplied from the control signal output end 36C to the control signal input terminal 37A of the illumination driver unit 37. In the illumination driver unit 37, illumination power depending upon the illumination control signal is generated. The illumination power is supplied from the illumination power output end 37B to the illumination power input end 39A of the illumination apparatus 39. The subject is illuminated from the illumination apparatus 39 with illuminance depending on the illumination power.

The driver control signal is supplied from the driver control signal output end 36B to the control signal input end 38A of the filter motor driver unit 38. In the driver unit 38, a drive signal of the drive motor 41 is generated on the basis of the driver control signal. The drive signal is supplied from the drive signal output end 38B to the drive motor 41. The variable ND filter 40 is rotated by an angle depending upon the drive signal to optimize the condition of shooting of the subject performed by the video camera main body 26.

Even if the illumination driver unit 37 and the filter motor driver unit 38 are in such a state that information cannot be transmitted and received by commands conforming to the VISCA standards, it is possible on the video camera main body side in the embodiment shown in FIG. 8 to control the illumination driver unit 37 and the filter motor driver unit 38 by information using commands conforming to the VISCA standards owing to the provision of the user port 26C in the video camera main body 26.

Yet another embodiment of the present invention will now be described by referring to FIG. 9. The same components as those shown in FIGS. 1 to 8 are denoted by like characters, and detailed description thereof will be omitted.

Figure 9:
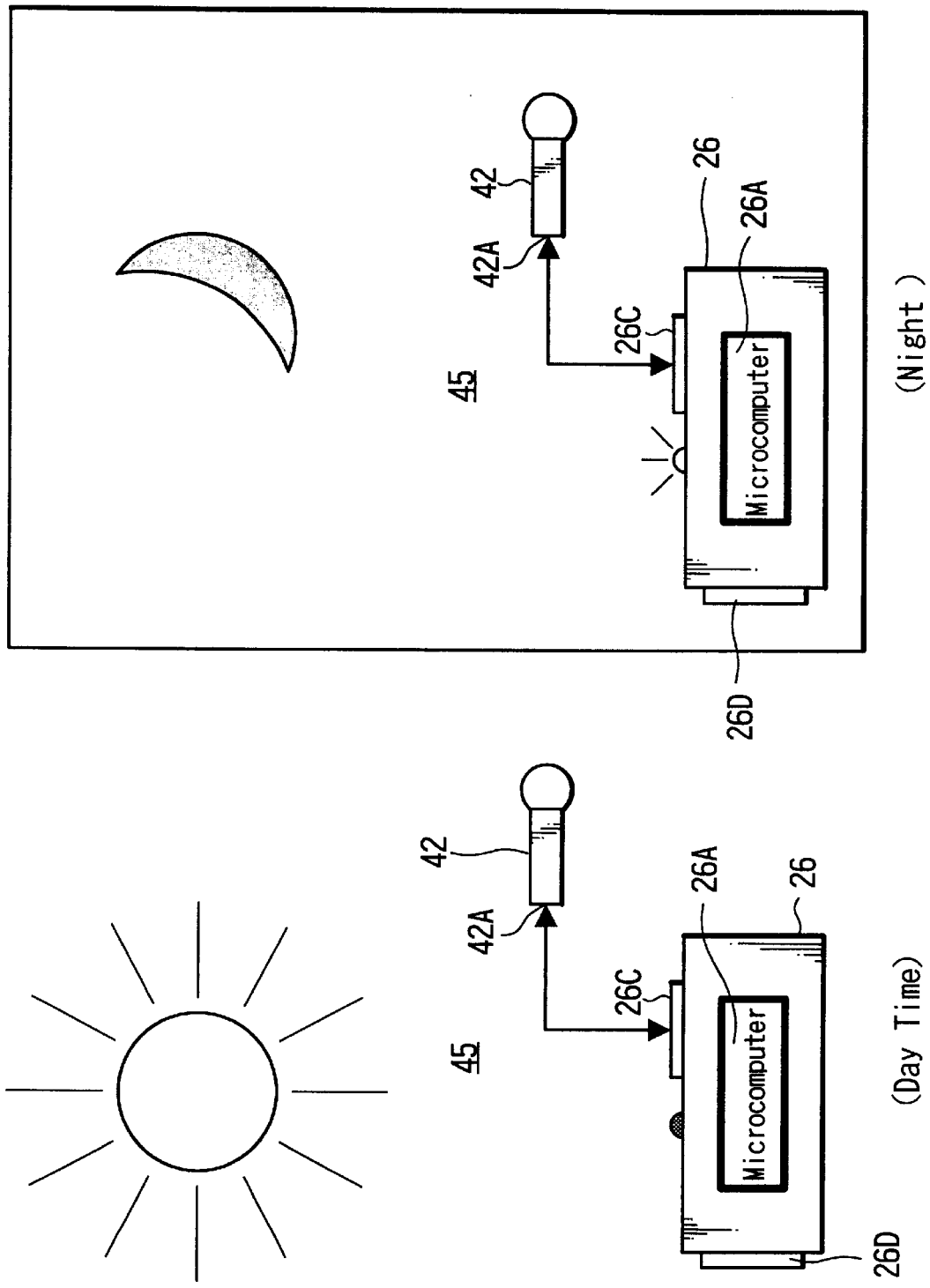
FIG. 9 is a block diagram for description of yet another embodiment of the present invention

FIG. 9 shows a principal part of an illumination system 45. The illumination system 45 includes a video camera main body 26, a one-chip microcomputer 26A built in the main body 26, a user port 26C, a lens block unit 26D, and an illuminance sensor 42. The user port 26C is connected to an input/output port 42A of the illuminance sensor 42.

In the illuminance sensor 42, a signal having a level value depending upon an illuminance detected by the illuminance sensor 42 is generated. The signal having the level value is inputted from the input/output port 42A of the illuminance sensor 42 to the user port 26C. In the one-chip microcomputer 26A, the signal having the level value is processed by using a VISCA command. According to the result of the process, the iris quantity adjustment of the lens block unit 26D of the video camera main body 26 and/or signal gain adjustment of the shot subject in the video camera main body 26 can be controlled.

In the present embodiment, the signal having the level value depending on the illuminance detected by the illuminance sensor 42 can this be processed by using a VISCA command. Therefore, it is possible to enjoy advantages of the VISCA commands having a wide variety of functions, such as automatic switchover of the illumination power supply between the daytime and the night, or switchover of an illumination power supply to infrared shooting mode and switchover of the video camera main body 26 in shooting mode.

In the example described heretofore with reference to the embodiments shown in FIGS. 1 to 9, a control signal port of a video camera apparatus having a processing function of control signals using the VISCA is connected to a control signal port of an external apparatus of the video camera which does not have such a processing function of control signals using the VISCA, and thereby transmission and reception of the control signals between the video camera apparatus and the external apparatus of the video camera are made possible.

However, the present invention is not restricted to such transmission and reception of control signals between the video camera apparatus and the external apparatus of the video camera. In transmission and reception of control signals between one of various signal processing apparatuses and its external apparatus, such as between a video signal recording and reproducing apparatus and an editing apparatus controlled thereby, it is now assumed that one of them has a processing function of coded control signals such as VISCA whereas the other does not have such a processing function of coded control signals. In such a case, it is a matter of course that the present invention may be applied to the side having the processing function of control signals conforming to the VISCA.

According to the present invention, means for delivering mutual signals between a control signal processing system for coding and processing control signals such as VISCA and a control signal processing system for processing signal information as a signal level value is added to the control signal processing system for coding and processing control signals. As a result, it becomes possible to connect control signals of a device which does not have a control signal processing system for coding and processing the control signal to a control signal processing system for coding and processing the control signal. The degree of freedom on connection between devices is expanded.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An information transmission method comprising the steps of:

assigning a digital code signal to an input control signal having information represented as an analog signal level value, said digital code signal being assigned depending upon said analog signal level value, wherein said digital code signal is selected from one of a plurality of encoding tables, and said one of said plurality of encoding tables is replaced by another one of said plurality of encoding tables by supplying an encoding table replacement instruction as said input control signal, and each of said plurality of encoding tables is a correspondence table between said analog signal level value and said digital code signal; and transmitting said assigned digital code signal.

2. An information processing method comprising the steps of:

assigning a digital code signal to an input control signal having information represented as an analog signal level value, said digital code signal being assigned depending upon said analog signal level value, wherein said digital code signal is selected from one of a plurality of encoding tables, and said one of said plurality of encoding tables is replaced by another one of said plurality of encoding tables by supplying an encoding table replacement instruction as said input control signal, and each of said plurality of encoding tables is a correspondence table between said analog signal level value and said digital code signal; and processing said assigned digital code signal.

3. An information processing apparatus comprising:

means for assigning a digital code signal to an input control signal having information represented as an analog signal level value, said digital code signal being assigned depending upon said analog signal level value, wherein said digital code signal is selected from one of a plurality of encoding tables, and said one of said plurality of encoding tables is replaced by another one of said plurality of encoding tables by supplying an encoding table replacement instruction as said input control signal, and each of said plurality of encoding tables is a correspondence table between said analog signal level value and said digital code signal; and means for processing said assigned digital code signal.

4. An electronic device comprising:

means for assigning a digital code signal to an input control signal having information represented as an analog signal level value, said digital code signal being assigned depending upon said analog signal level value, wherein said digital code signal is selected from one of a plurality of encoding tables, and said one of said plurality of encoding tables is replaced by another one of said plurality of encoding tables by supplying an encoding table replacement instruction as said input control signal, and each of said plurality of encoding tables is a correspondence table between said analog signal level value and said digital code signal; and means for transmitting said assigned digital code signal.

5. An imaging apparatus comprising:

means for assigning a digital code signal to an input control signal having information represented as an analog signal level value, said digital code signal being assigned depending upon said analog signal level value, wherein said digital code signal is selected from one of a plurality of encoding tables, and said one of said plurality of encoding tables is replaced by another one of said plurality of encoding tables by supplying an encoding table replacement instruction as said input control signal, and each of said plurality of encoding tables is a correspondence table between said analog signal level value and said digital code signal; and means for transmitting said assigned digital code signal.

* * * * *